(12) United States Patent
Kronholm, Jr.

(10) Patent No.: US 7,147,474 B1
(45) Date of Patent: Dec. 12, 2006

(54) MOTIVATIONAL DEVICE FOR TEAM COMPETITIONS

(76) Inventor: Conrad J. Kronholm, Jr., 101 Lyme St., Old Lyme, CT (US) 06371

( * ) Notice: Subject to any disclaimer, the term of this patent is extended or adjusted under 35 U.S.C. 154(b) by 493 days.

(21) Appl. No.: 10/692,567

(22) Filed: Oct. 24, 2003

(51) Int. Cl.
*G09B 19/00* (2006.01)

(52) U.S. Cl. .................... 434/236; 434/247

(58) Field of Classification Search .......... 434/236, 434/247, 248, 251, 433; 446/129, 144, 145; 32/146, 159.1, 207.2; D32/40, 50
See application file for complete search history.

(56) References Cited

U.S. PATENT DOCUMENTS

D422,319 S * 4/2000 Pool et al. ............ D21/400
6,631,905 B1 * 10/2003 Slade .................. 273/244
2005/0017452 A1 * 1/2005 Jiang Stein ............ 273/292
2005/0151321 A1 * 7/2005 Hennessy et al. ........ 273/302

FOREIGN PATENT DOCUMENTS

CA        2364287    *  7/2006

* cited by examiner

*Primary Examiner*—Kurt Fernstrom
(74) *Attorney, Agent, or Firm*—C Nessler

(57) ABSTRACT

Apparatus for communicating and motivating metaphorically about winning in a sports team or other team competition comprises a broom handle having a first group of figurines attached thereto by their heads, and extending outwardly, as do bristles of a brush. The first group wears uniforms of a first team. A dustpan contains a second group of figurines, reposed in disorderly fashion in a dustpan, as they may have been swept there by the broom assembly. The second group is dressed with uniforms of one or more competitors of the first group team. The invention communicates a "clean sweep" metaphor, i.e., the first team wins, by overcoming the one or more competitors in the dustpan.

17 Claims, 3 Drawing Sheets

MOTIVATIONAL DEVICE FOR TEAM COMPETITIONS

TECHNICAL FIELD

The present invention relates to means and method for motivating persons with respect to competing in sports or other competitive activities.

BACKGROUND

In competitive team sports, particularly those where there is physical contact between the players during games, there has traditionally been a need to motivate players, so they play to in a way which overcomes the opponents and wins a sports competition, for instance a game or series of games. To do this, one of approach of managers and leaders is to create a sense of identity amongst the players of a team, and to contrast that identity with those of the opponent. One well-known approach is to have the players wear uniforms, that is, distinctive dress or clothing. Uniforms also fill the practical need to easily identify members on each team, particularly with sports such as football, basketball and hockey, where the players intersperse and move quickly during competition. For instance, the clothing of one team might comprise a green and white striped jersey, a green cap or helmet, and plain white pants, parts of which bear an emblem or symbol resembling a first animal, which is symbolic of the team name. The opponent team might be dressed in different patterns where the color red dominates, and have an emblem resembling a second animal, or an article, e.g. a horseshoe.

The common features of uniforms, especially the colors and emblems of such may be put to other use. For example, those things may be represented in other displays, for instance in flags and signs—to create a metaphor, that is, an understanding and experience of one thing (e.g., the uniform, color, or symbol of a player or team) in terms of another (e.g., achieving the goal of winning a game or trophy). It is the same kind of understanding and experience that a person may have when seeing a picture of an national flag on a product, where the flag reflects a sense of patriotism; and, thus the flag on a consumer product will be representative of the person's commitment to the nation's product manufacturer. In sports, certain colors and symbols are strongly identified with certain teams, and that identification is reinforced by media coverage. It is in the interest of the leaders or a team, in seeking to win a competition to reinforce such metaphors in the players and in the sports fans who attend competitions.

Sports players can obtain psychological and motivational encouragement from sports fans that attend competitive events. And, many team sports are played with a view to generating income for the teams, from paid attendance and from making sales of team-brand products. Thus, it is in the interest of a competitive sports team to have fans who have a psychological commitment to the team, and who are motivated to support the team in an exhortative and financial manner. The present invention seeks to serve that end. There are many other competitive endeavors, including in business and government affairs, and groups engaged in those have the same motivational needs as in sports.

SUMMARY

An object of the present invention is to provide a means for motivating team players engaged in sports and other endeavors, so they identify with one another, and to motivate them in thought and feelings as a team, so they make maximum effort toward winning against opposing teams in competitive events. A further object is to motivate sports fans in support of teams' achievement of the same goals. A still further object of the invention is to elicit metaphors for winning.

In accord with the invention, apparatus and method for communicating and motivating metaphorically about winning in a sports team or other team competition comprises a broom assembly and a dustpan assembly. The broom assembly comprises a broom handle, with a first group of figurines connected to the handle by their heads or some other part. The figurines extend transversely to the length of the broom handle, as do bristles of a normal broom. When communicating about a sports competition, the first group wears uniforms of a first team. The dustpan assembly comprises a dustpan and a second group of figurines, which wear the uniforms of one or more other sports teams. The figures of the second group lie about, in disorderly fashion, in a dustpan, communicating that they have been swept there by the broom assembly. The invention communicates a "clean sweep" metaphor, that is, that the first team wins by overcoming the one or more competitors which have been swept into the dustpan. When a competition other than sports is being represented, for instance business or political competition, the first and second group figurines will have uniforms appropriate to that situation.

Preferably, the first group of figurines are made of semi-rigid or rigid plastic, and have similar posture and orientation; and, their the heads are adhered directly to the broom handle as by mechanical or adhesive attachment. Alternately, the figurines are connected to the handle by bristles. Preferably, the handle is like that of a common counter broom. In another embodiment, a whisk broom or other kind of broom is represented.

Preferably, the second group of figurines has the same shape and size as the first group, and they lie loosely in the dustpan. The broom assembly with cantilevered first figurines can be used to sweep the second group figurines into the dustpan. Alternately, the second group figurines are adhered or integral with the dustpan.

The invention may be provided in kit form. Figurines may optionally be provided with uniforms which are comprised of separate pieces, such as self-adhesive sheets or stickers. Thus, the identity of the individual figurines can be selected or changed by the user.

The foregoing and other objects, features and advantages of the invention will become more apparent from the following description of preferred embodiments and accompanying drawings.

DESCRIPTION

An apparatus embodying the invention is comprised of two related components, a broom assembly 20 and a dustpan assembly 22. Each component comprises associated figurines representing sports teams that are in actual or potential competition. In use, the two components are placed in visual-spatial relationship to one another and elicit in the minds of viewers a maxim familiar in sports, that of making a "clean sweep", e.g., winning all of a series of competitive games.

A first group of figurines, symbolizing sports players of a first team, is adhered to the broom. They are dressed alike, with the uniform of a first team. A second group of figurines, symbolizing the players of one or more second teams, are contained within the dustpan. In one embodiment, each figurine is dressed differently, in the uniform of one of many different opponent teams. In another embodiment, all figurines are dressed the same, in the uniform of one opponent team.

Figure 1:
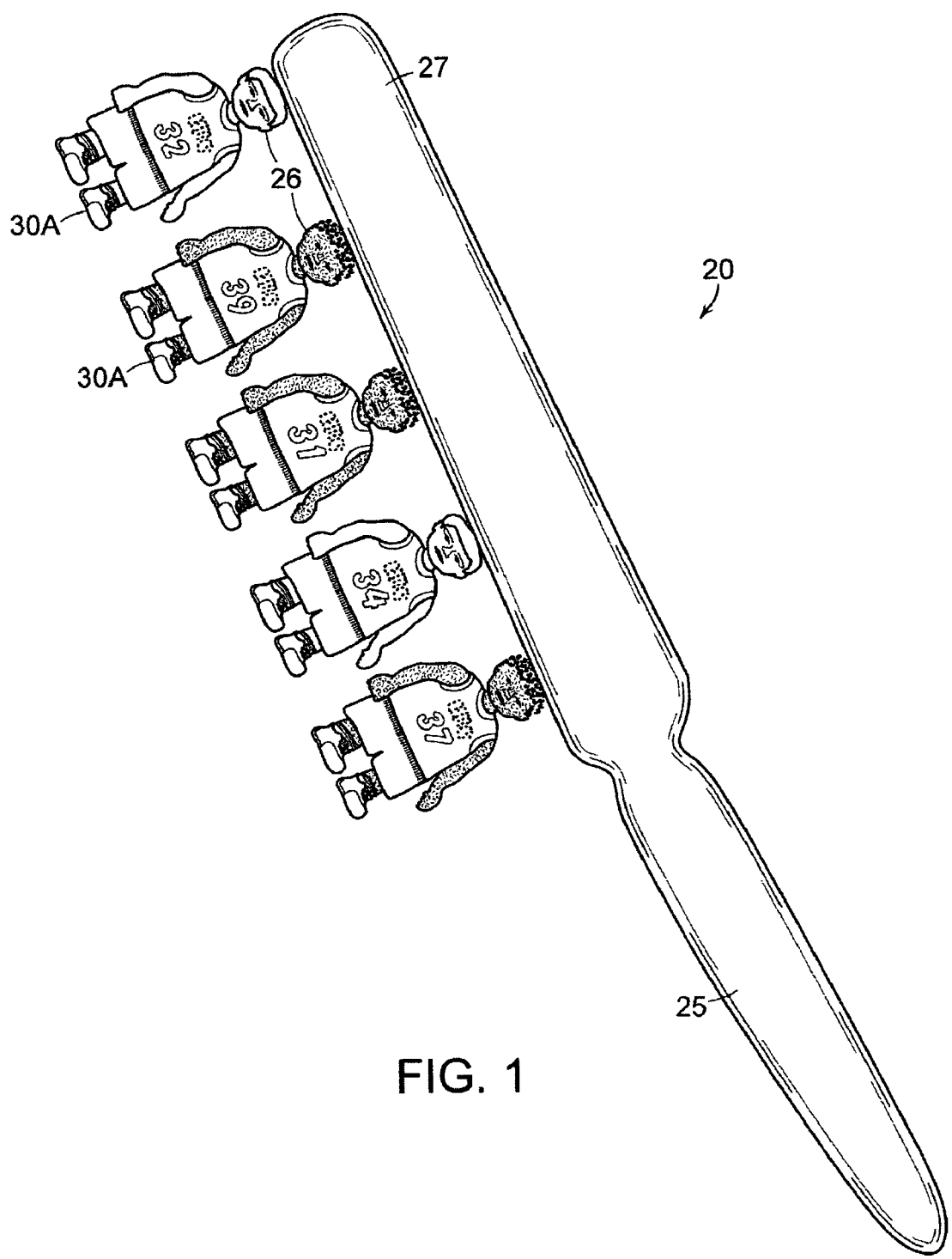
FIG. 1 shows a counter broom, wherein identically aligned and dressed stylized figurines of sports players are attached to the broom by the figurine head in the place of bristles.

More particularly, in an embodiment of the invention shown in FIG. 1, the broom assembly 20 is comprised of broom body 24, and a first group of figurines 30A. Figurines 30A are connected to the broom by their heads, and extend from the body 24 transverse to the length, as do the bristles in a conventional counter brush type broom, for contacting and moving objects. Broom body 24 has a portion which is a grasping handle 25, for use when sweeping objects. Broom body may be made of wood or plastic or other material.

Figure 3:
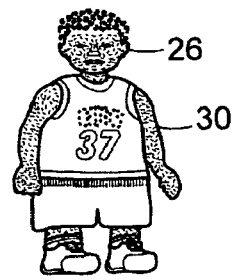
FIG. 3 shows one of the figurines of FIG. 1.

As shown by FIG. 3, each figurine is a stylized, somewhat abstract and doll-like representation of a human being member of a first sports team. Preferably, the figurines are made of a rigid or semi-rigid material, such as thermoplastic, in particular polyethylene. The term figurine refers to an animal form, representational or semi-abstract, having at least a head and body; and, arms and legs in more full embodiments. Figurines 30A all have substantially identical dress or garb, commonly referred to as "sport uniform", characteristic of those worn by players of a particular actual sports team. The term uniform as used here refers to a distinctive outfit, to identify those who wear it as members of a certain group. As is well known, certain features of a uniform within may vary within such substantially identical sports uniforms. For instance, the player's number or name may vary from one figurine to the next.

In the FIG. 1 embodiment of the invention, figurines attached to the broom are representative only of a first sports team, by virtue of their uniforms. Preferably, figurines 30A of the broom 20 have substantially identical size, posture and orientation as shown in the Figures, because such uniformity will non-verbally communicate strength, e.g., features of a "human wall". Alternately, figurine posture or orientation may be varied within the group, for different effect. For instance, some figurines may be aggressively postured, others defensively Within a uniformity of presentation, first group figurines may have somewhat different orientations and somewhat varying postures. And, within the generality of "uniformity" as used herein, and which communicates team identity, a group of figurines may have different simulated skin color, to represent different races, as suggested by FIG. 1. And, the figurines may have other features to represent different physical characteristics, such as features that suggest gender, height, hair type, facial features, or well known distinguishing features of a particular individual, and so forth.

Figurines 30A may be arranged in two or more parallel rows in other embodiments. Figurines 30A may be permanently attached, as by adhesive or integral molding, or may be detachable, as by a molded projection from a figurine being captured within a tight fitting socket on the broom handle.

Figure 2:
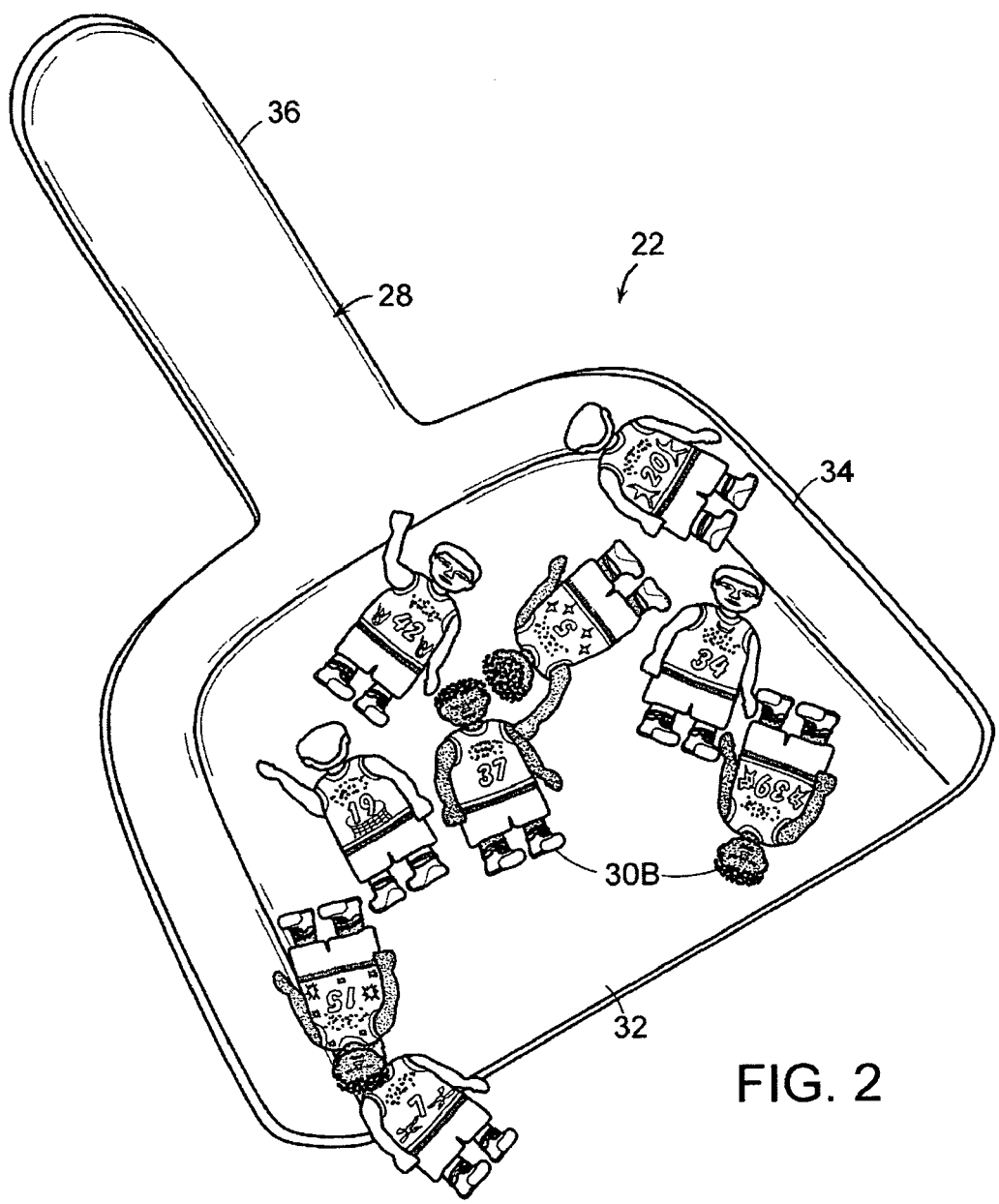
FIG. 2 shows a dustpan, for use in conjunction with the broom of FIG. 1, wherein arbitrarily un-aligned and diversely dressed figurines repose in the bed of the pan.

As shown by FIG. 2, the dustpan assembly 22 is comprised of a pan 28 and a second group of figurines 30B reposed on the bed 32 of the pan. Pan 28 has the shape of a conventional dustpan. Flared sidewalls 34 run around three sides of the bed 32, to contain objects on the bed; and handle 36 extends from the rear of the bed, so the pan can be conveniently held. The dustpan may be made of plastic, metal, wood or other structural material.

Pan 28 is proportioned to the broom assembly 20, to communicate to the viewer that the broom assembly can be used in conjunction with the dustpan. For example, the width of the bed of the pan may be approximately equal to or greater than the length of the row of figurines on the broom. Thus, a person looking at the two assemblies 20, 22 as they are displayed conjunctively in use, will appreciate that the particular broom 20 is suited for sweeping comparatively small objects, e.g., figurines 30B, into the bed 32 of pan 28, and imagine said figurines have been swept there by the broom assembly. In the generality of the invention, other configurations of dustpan, like those known in the art, may be employed in substitution of the common shape pan in FIG. 2.

The multiplicity of figurines 30B, comprises a second group, representing human members of one or more other sports teams, which team(s) is different from the first sports team simulated by the figurines 30A, which are attached to the broom. In one embodiment, each figurine 30B is substantially alike, to identify a second team. Therefore, the second group would be dressed with the stylized uniform of an actual or potential rival team. In another embodiment, some or all of figurines 30B are distinct in appearance from each other, as well as from the figurines of the first group. For example, each figurine 30B may represent a player of another different competitor team of the team represented in the broom assembly. And, in one embodiment, the group of figurines 30B will represent all the major competitors of the first team, which is represented by figurines 30A of broom assembly 20.

Figurines 30B have proportions like those of the first group of figurines; preferably the figurines are identical in size. And, the proportions of all figurines are small with respect to the dimensions of bed 32 of pan 28, so it can be conceived that the dustpan is suited for receiving figurines which may be swept into the dustpan. The second group of figurines 30B are reposed in the bed of pan 28; they are in any position other than standing. For instance they may be lying or sitting, again to suggest defeat and disarray, and to reflect or to suggest, as the case may have been, that they have been swept away and into the pan.

When placed in proximity, the non-verbal and metaphor communication of the two components 20, 22 is that the team of the first group (broom assembly 20) has or will overcome and defeat the team or teams of the second group (dustpan assembly 22). This is because the first group/team is part of the active or forceful component, the broom, and is organized as a group. Whereas, the second group is part of the passive and receiving item, the dustpan; and, it is disorganized. The dustpan symbolizes a hierarchal lower state, as a container for something that is useless and suitable for discard.

Functionally, the figurine groups and components may physically interact. For instance, a person may grasp the broom assembly 20 at portion 25, and use it as a broom, to sweep figurines 30B from any surface upon which they have been previously placed, onto the bed 32 of pan 28. The figurines 30A will act in the same way as do ordinary bristles of a broom, in contacting and pushing the figurines 30B into the pan.

In one mode of using the invention, figurines 30B are manually arranged to repose within the pan, so that the different figurines are spaced apart and oriented in a way which suits the fancy of the user. In aspect of this mode, the figurines 30B are loose within the pan. In another mode, figurines 30B may be attached to the pan, for instance by adhesive or permanent means. Alternately, the figurines may be removably attached with a two-part hook and loop type fastener system, by magnets (when the pan is metal), adhesive, or other releasable means. In another display arrangement, for any mode, broom assembly 20 may be overlaid onto pan 28 and the figurines contained therein.

Figure 4:
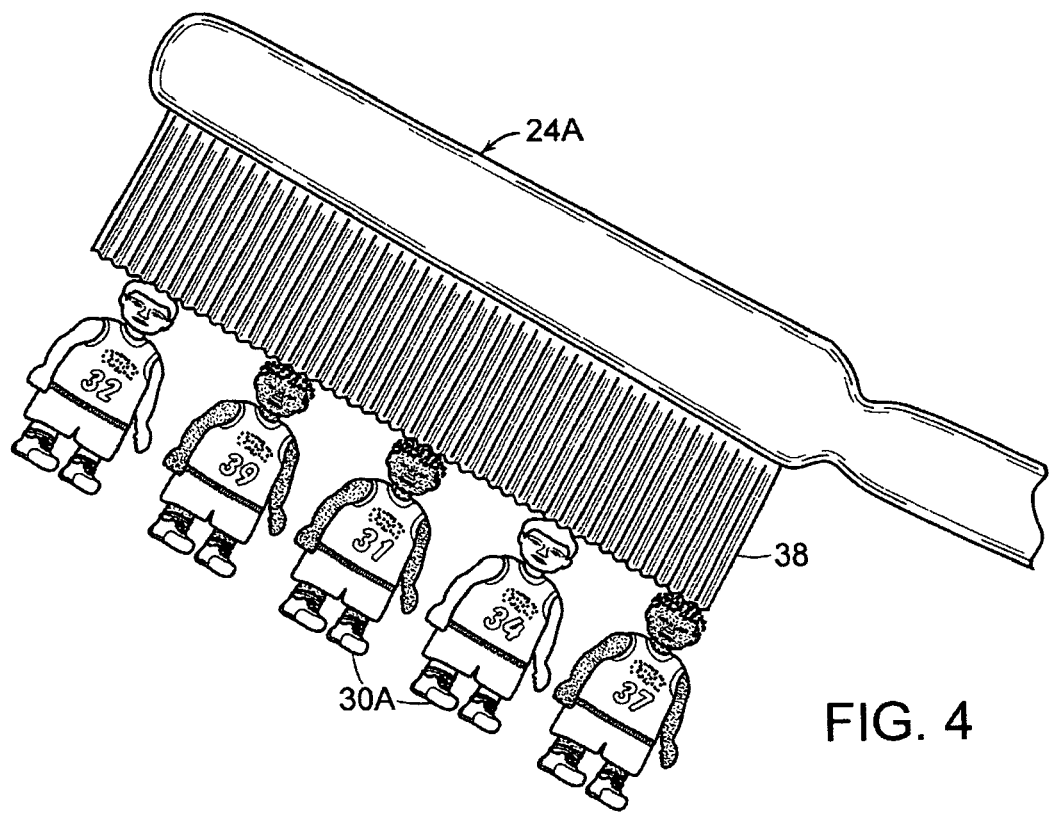
FIG. 4 shows another broom, wherein a plurality of identically aligned and dressed figurines are attached to the bristles of a counter broom.
Figure 5:
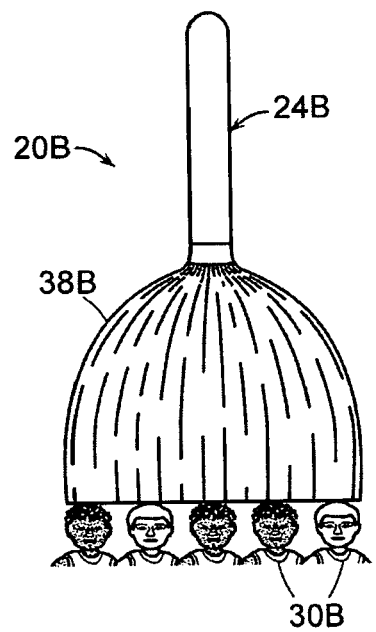
FIG. 5 is a semi-schematic view of a whisk broom with figurines attached to the bristles by their heads.

FIG. 4 shows another embodiment of the invention, wherein the heads of figurines 30A are connected to broom body 24A by means of bristles 38. The figurine heads or other parts may be glued or otherwise fastened to the bristles. In further embodiments, the figurines may be attached to the broom by simulated body parts other than the head, for instance by upwardly extended arms, or by legs or feet. In still other embodiments, different shape brooms may be used. FIG. 5 shows whisk broom 20B, having bristles 38B, to which are attached the heads of figurines 30B, so that the lengths of the figurines run parallel to the length of broom handle 24B. In other embodiments, the broom simulated may be a floor broom, a common sweep broom, or another kind of broom.

Figurines 30A, 30B may be constructed in various ways, associated with making dolls and toy animals. For instance, they may be made of molded plastic, as described, as are figurines associated with popular toy systems, where small plastic blocks and other pieces "snap together" to form larger objects. The plastic of the figurines may be rigid or semi-rigid, plastic, for instance, epoxy, or polyethylene having a selected density or structure; or a rubber having a selected Durometer. Alternately, figurines may be made as soft sculpture, e.g., or cloth or other fabric stuffed with deformable material, including vegetation or man-made products. In another mode, figurines may be balloon-like, and filled with air or other gas. The uniform which any figurine wears will commonly be painted on, or integral with, the surface of the figurine. Alternately, pieces of sheet or fabric may be put on the figurine While figurines will ordinarily have the features of human beings, since it is with human sports that the invention will be mostly used, in special instances, the figurines may have features resembling animals. For instance, if a team mascot is associated with a particular animal, e.g., cat, dog, wolf, bear, the features of that animal may be suggested in part in figurines, to strengthen the identify of the particular figurine(s) with the particular team. For instance, one or more of the figurines in the second group might have the visage of a wolf, or have a tail, etc., while still overall having a shape which communicates that the figurine is evocative of a human member or player of a particular team.

In one way of carrying out the invention, a kit is provided to a player or fan of sports, or customer. Figurines 30A may have been previously attached to the broom 24, 24A; or, they may be provided separately, for attachment by the purchaser. The user causes the figurines 30B to be arrayed in disorder in the dustpan, and views the result, thus providing an internal satisfaction and stimulating and motivating the player or fan through metaphor. For a player, the result will be a strengthening of identity with his or her team and an enhancement of play or performance, during actual competition. If laid out, for viewing in a display place, the construct created continues to communicate in a non-verbal way group identification relative to the broom adhered group of figurines, and a competitive message for that group to win over the teams of the dustpan reposed figurines.

In another embodiment of the invention, a plurality of attachments representing uniforms are provided, for instance self-adhesive printed-paper or plastic film pieces or plastic sleeves. This feature could lessen manufacturing and inventory factors, and enable changing of the meaning of the metaphor over time. Thus, portions of uniform, for some or all of either or both groups of figurines may be applied to the surfaces of the figurines. The portions might be applied by the manufacturer, or by the customer—who would be provided with an array to select from. Thus, the user could determine the uniformity or lack of uniformity amongst the figurines, and make changes over time. In an alternate and more costly embodiment, different selections of figurines having different permanently attached uniforms are provided in a kit.

While the preferred embodiment has been described in terms or sports team competition, the invention may be applied to other group activities, beyond the field of sports. For instance, it may be applied for use with groups competing within an commercial endeavor industry or political activity, wherein the uniform may be the colors and symbol of the employer, worker or tradesman organization, party, or other group, as applicable.

Although this invention has been shown and described with respect to one or more preferred embodiments, and by examples, such should not be considered as limiting the claims, since it will be understood by those skilled in the art that various changes in form and detail thereof may be made, and that equivalents thereof may be made, without departing from the spirit and scope of the claimed invention.

I claim:

1. Apparatus for non-verbally communicating about, and for motivating a person about, winning in a team competition, which comprises:
    a broom assembly, comprising a handle and a first group of figurines, each figurine connected in cantilever fashion to the handle;
    a dustpan, proportioned for use with said broom assembly, having a bed for receiving objects; and,
    a second group of figurines, each figurine having a distinct appearance from the figurines of the first group, the figurines dimensioned and shaped so that they may be received within the bed of the dustpan in reposed condition;
    wherein the broom assembly is shaped for sweeping objects, including said second group of figurines, into the bed of the dustpan.

2. The apparatus of claim 1, wherein the figurines of the second group and first group have substantially similar sizes.

3. The apparatus of claim 1, wherein each figurine in the first group wears a first uniform, and each figurine of the second group wears a second uniform.

4. The apparatus of claim 1, wherein each figurine in the first group wears a first uniform, and wherein the figurines of the second group predominantly each wears a uniform which is different from said first uniform and different from each other.

5. The apparatus of claim 3, wherein the uniforms are simulative of sports team uniforms.

6. The apparatus of claim 4, wherein the uniforms are simulative of sports team uniforms.

7. The apparatus of claim 1, wherein the preponderance of first group figurines are substantially identical to each other in posture and orientation.

8. The apparatus of claim 1 wherein the first group figurines are aligned in a row; and wherein, each first group figurine is attached to the handle by its head.

9. The apparatus of claim 8, further comprising bristles extending from the broom handle, wherein each first group figurine is attached to the handle by means of said bristles.

10. The apparatus of claim 1 wherein at least one of said second group figurines is fastened to the bed of the dustpan.

11. The apparatus of claim 1, wherein the broom handle is a counter brush broom handle; and wherein the first group figurines cantilever transversely to the length of said handle.

12. The apparatus of claim 1 wherein said figurines are rigid or semi-rigid molded plastic.

13. The apparatus of claim 1, wherein a multiplicity of figurines in either said first group or said second group have separable sheet portions of uniforms attached to the surfaces thereof.

14. The apparatus of claim 1 wherein the figurines are stylized human beings.

15. A kit comprised of a broom having a handle, a group of first figurines having uniforms representing a first sports team, each first figurine attached or attachable to the handle of the broom, to extend in cantilever fashion from the handle;
- a dustpan, proportioned for use with said broom, having a bed for receiving small objects; and,
- a second group of figurines having uniforms representing of one or more second sports team, having proportions like those of said first group figurines, and proportions which are small with respect to the dimensions of the bed of said the dustpan;
- wherein, the components of the kit may be assembled to form a broom assembly with said first group of figurines attached to said handle; wherein, said second group of figurines may be assembled to repose in the bed of said dustpan and thereby form a dustpan assembly; and, wherein said broom assembly and said dustpan assembly may be positioned in juxtaposition, to communicate a sports metaphor of "clean sweep".

16. The kit of claim 15 further comprising portions of uniforms which may be selectively affixed to the at least some of said figurines.

17. A method of non-verbally communicating a sports metaphor, which comprises:
- providing a broom comprising a first group of figurines having first uniforms, which represent a first sports team, wherein the first group of figurines is cantilevered from a broom handle as a closely spaced apart and aligned group, like bristles of a normal broom; and,
- providing a dustpan having a bed holding a second group of sports figurines, having proportions substantially similar to the first group, and having uniforms which represent one or more second sports teams;
- wherein, the dustpan and broom are similarly proportioned for use with one another, so that the broom and first figurine group may be used to sweep the second figurine group into and about the dustpan.

* * * * *